United States Patent
Zhu

(10) Patent No.: US 10,648,638 B2
(45) Date of Patent: May 12, 2020

(54) PROCESS FOR OBTAINING A LIGHT-SCATTERING ASSEMBLY IN PARTICULAR FOR A MOTOR VEHICLE

(71) Applicant: VALEO VISION, Bobigny (FR)

(72) Inventor: Lingxuan Zhu, Bobigny (FR)

(73) Assignee: VALEO VISION, Bobigny (FR)

( * ) Notice: Subject to any disclaimer, the term of this patent is extended or adjusted under 35 U.S.C. 154(b) by 3 days.

(21) Appl. No.: 15/718,131

(22) Filed: Sep. 28, 2017

(65) Prior Publication Data
US 2018/0087738 A1 Mar. 29, 2018

(30) Foreign Application Priority Data

Sep. 28, 2016 (FR) ...................................... 16 59224

(51) Int. Cl.
*F21S 43/20* (2018.01)
*B29C 45/17* (2006.01)
(Continued)

(52) U.S. Cl.
CPC .............. *F21S 43/26* (2018.01); *B29C 45/17* (2013.01); *F21S 41/285* (2018.01); *F21V 5/002* (2013.01);
(Continued)

(58) Field of Classification Search
CPC .................... F21S 43/26; F21V 5/002–005
See application file for complete search history.

(56) References Cited

U.S. PATENT DOCUMENTS 5,721,039 A * 2/1998 Yanagihara ........... B29C 45/062
359/642
5,756,013 A 5/1998 Yanagihara et al.
(Continued)

FOREIGN PATENT DOCUMENTS

EP 2 179 833 A1 4/2010
FR 2 172 127 9/1973
(Continued)

OTHER PUBLICATIONS

French Preliminary Search Report dated May 22, 2017 in French Application 16 59224, filed on Sep. 28, 2016 (with English Translation of Categories of Cited Documents).

*Primary Examiner* — Sean P Gramling
(74) *Attorney, Agent, or Firm* — Oblon, McClelland, Maier & Neustadt, L.L.P.

(57) ABSTRACT

The invention relates to a process for obtaining a light-scattering assembly in particular for a motor vehicle, the light-scattering assembly comprising a part including first and second sections. The process includes forming, by injection molding, the first section of the light-scattering assembly, the first section forming a transparent scattering screen having microstructures obtained by injection molding and configured to scatter light passing through said first section, and forming, by injection molding, the second section, the second section being devoid of microstructures obtained by injection molding and configured to scatter light. The second section has an external region extending around at least some of the perimeter of the first section, the external region extending beyond a peripheral portion of the first section [and away from the first section, the first and second sections being formed in contact with each other and being united with each other.

18 Claims, 2 Drawing Sheets

(51) Int. Cl.
  *F21S 41/20*     (2018.01)
  *F21V 5/00*      (2018.01)
  *B29L 31/30*     (2006.01)

(52) U.S. Cl.
  CPC .............. *B29K 2995/0025* (2013.01); *B29K 2995/0026* (2013.01); *B29L 2031/30* (2013.01)

(56) References Cited

U.S. PATENT DOCUMENTS

| | | |
|---|---|---|
| 5,922,369 A | 7/1999 | Yanagihara et al. |
| 6,045,246 A * | 4/2000 | Goto ................... F21S 43/51 362/521 |
| 2005/0003159 A1* | 1/2005 | Ikeda ................... B29C 45/16 428/156 |
| 2010/0096771 A1 | 4/2010 | Choi et al. |
| 2013/0100690 A1 | 4/2013 | Dereani et al. |
| 2013/0155676 A1* | 6/2013 | Lee ........................ F21V 7/22 362/235 |

FOREIGN PATENT DOCUMENTS

| | | |
|---|---|---|
| FR | 2 301 357 | 9/1976 |
| FR | 2 853 952 A1 | 10/2004 |

\* cited by examiner

PROCESS FOR OBTAINING A LIGHT-SCATTERING ASSEMBLY IN PARTICULAR FOR A MOTOR VEHICLE

The invention relates to the field of light-scattering assemblies in particular to light-scattering assemblies for motor vehicles.

In the automotive field, and in particular in lighting and/or signaling devices, structures with scattering properties and that are arranged on the optical path of the light emitted by a light-emitting source axe frequently employed.

This in particular makes it possible to improve the uniformity of the obtained lighting effect, this being particularly advantageous when the light-emitting source comprises a plurality of point-like light-emitting elements such as light-emitting diodes.

The use of scattering structures is however not without drawbacks. Specifically, these structures often comprise microstructures arranged on a transparent face thereof and forming a scattering screen.

These microstructures are particularly fragile, making them difficult to handle. This fragility in particular tends to be particularly marked for microstructures produced by injection molding, insofar as they are generally produced from a thermoplastic that is more fragile than the thermosets usable in manufacturing processes not employing injection molding.

The invention was made in this context and in particular aims to obtain a light-scattering assembly of this type that decreases the risk of degradation of scattering microstructures, in particular those obtained by injection molding.

To this end, the invention relates to a process for obtaining a light-scattering assembly in particular for a motor vehicle, the light-scattering assembly comprising a part including first and second sections, the process comprising:
  forming, by injection molding, the first section of the light-scattering assembly, the first section forming a transparent scattering screen having microstructures obtained by injection molding and configured to scatter light passing through said first section; and
  forming, by injection molding, the second section, the second section being devoid of microstructures obtained by injection molding and configured to scatter light, the second section comprising an external region extending around at least some of the perimeter of the first section, the external region expending beyond a peripheral portion of the first section and away from the first section,
the first and second sections being forced in contact with each other and being united with each other.

According to one aspect of the invention, the microstructures of the first section are arranged in the first section within a scattering region, the second section having an internal region that is arranged facing a peripheral portion of said scattering region around at least some of the perimeter of said scattering region.

According to one aspect of the invention, the second section is opaque.

According to one aspect of the invention, the second section is transparent.

According to one aspect of the invention, the first and second sections are formed by bi-injection molding.

According to one aspect of the invention, the first and second sections are produced from different materials.

According to one aspect of the invention, the first and second sections are produced from the same material.

According to one aspect of the invention, the microstructures are arranged in the first section on a first face of the first section and the first section makes contact with the second section via a second face or the first section opposite said first face.

According to one aspect of the invention, the second section includes fastening means suitable for fastening the light-scattering assembly to a receiving structure.

According to one aspect of the invention, the process furthermore comprises gripping the light-scattering assembly, said grip being achieved solely by means for handling the light-scattering assembly via the second section.

According to one aspect, of the invention, the first and second sections are integral with each other.

The invention furthermore relates to a light-scattering assembly, in particular for a motor vehicle, the light-scattering assembly comprising a part including:
  a first section forming a transparent scattering screen having microstructures obtained by injection molding and configured to scatter light passing through said first section; and
  a second section, the second section being devoid of microstructures obtained by injection molding and configured to scatter light, the second section comprising an external region extending around at least some of the perimeter of the first section, the external region extending beyond a peripheral portion of the first section and away from the first section, the first and second sections making contact with each other and being united with each other.

According to one aspect of the invention, the microstructures of the first section are arranged in the first section within a scattering region, the second section having an internal region that is arranged facing a peripheral portion of said scattering region around at least some of the perimeter of said scattering region.

According to one aspect of the invention, the first and second sections are produced from different materials.

According to one aspect of the invention, the second section is opaque.

The invention furthermore relates to a light-emitting device, in particular for a motor vehicle, comprising:
  the light-emitting source suitable for emitting light; and
  a light-scattering assembly such as defined above, the first section of said light-scattering assembly being interposed on the optical path of at least some of the light emitted by the light-emitting source.

According to one aspect of the invention, the light-emitting device is a lighting and/or signaling device for a motor vehicle.

The invention will be better understood on reading the following detailed description, which is given merely by way of example and with reference to the appended figures, in which:

FIG. 1 illustrates a light-emitting device 2 according to the invention (referred to as the device 2 below) configured to emit light.

The device 2 is advantageously a device intended to be integrated into a motor vehicle. In other words, it is a question of a motor-vehicle light-emitting device.

Advantageously, the device 2 is a motor-vehicle lighting and/or signaling device.

It is for example configured to provide one or more photometric functions.

A photometric function is for example a lighting and/or signaling function that is visible to the human eye. It will be noted that these photometric functions may be subject to one on more regulations specifying requirements in terms of color, intensity, spatial distribution on what is called a test screen, or even visibility ranges for the emitted light.

The device 2 is for example a lighting device and is then a vehicle headlamp or headlight. It is then configured to provide one or more photometric functions for example chosen from a low-beams function referred to as a "dipped-beam" function, a high-beam function referred to as a "main-beam" function, and a fog-light function.

Alternatively or in parallel, the device may be a signaling device intended to be arranged at the front or back of the vehicle.

When it is intended to be arranged at the front, the photometric functions that it is configured to provide (optionally in addition to those that it provides in its role as a lighting device) include a direction-indicator function, a daytime-running-light (DRL) function, a luminous function intended to give the front of the vehicle a signature look, a position-light function, and what is called a side-marker function.

When it is intended to be arranged at the back, these photometric functions include a reversing-light function, a brake-light function, a fog-light function, a direction-indicator function, a luminous function intended to give the back of the vehicle a signature look, a parking-light function, and a side-marker function.

Alternatively, the device 2 is provided to illuminate the passenger compartment of a vehicle and is then intended to emit light mainly into the passenger compartment of the vehicle.

Below, the device 2 is described nonlimitingly in a configuration in which it is intended to emit light at the exterior of the vehicle and is a rear signaling device.

Figure 1:
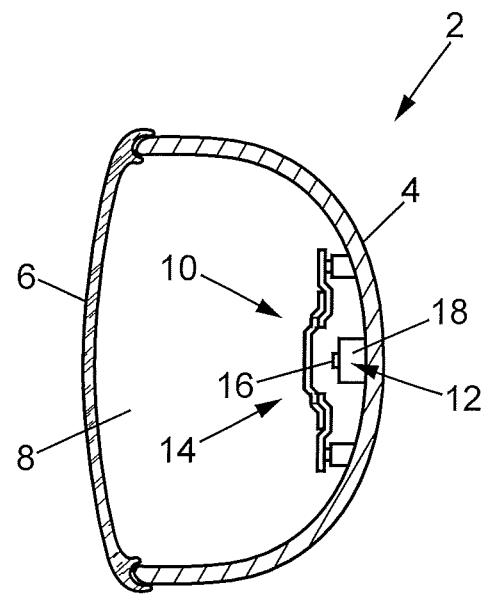
FIG. 1 is a schematic illustration of a light-emitting device according to the invention.

With reference to FIG. 1, the device 2 comprises a casing 4 and a closing outer lens 6, the casing and lens interacting with each other to define a cavity 8 internally.

The device 2 furthermore comprises a light-emitting module 10 according to the invention (referred to as the module 10 below) all or some of which is arranged in the cavity 8.

The module 10 forms the light-emitting core of the device 2.

It comprises a light-emitting source 12 and a light-scattering assembly 14 according to the invention (referred to as the assembly 14 below).

The light-emitting source 12 (referred to as the source 12 below) is configured to emit light during the operation of the device 2.

The source 12 for example comprises a plurality of light-emitting semiconductor elements 16 configured to emit light when they are supplied with electrical power.

These elements 16 for example take the form of light-emitting diodes.

They are arranged on a substrate 18 of the source 12 and are for example distributed over the substrate in at least one longitudinal direction of the substrate. They are for example configured to emit light in a preferred direction normal to the substrate (at least locally). However, alternatively, at least some of the diodes are configured to emit in a direction other than this normal direction, for example a direction comprised angularly between a direction tangent to the corresponding section of the substrate and this normal (such as for example a direction parallel to this tangent direction).

Generally, the light generated by the source 12 is emitted in the direction of the closing outer lens (optionally via an optical deviating device provided to deviate the light emitted by the elements 16).

The assembly 14 is configured to interact with at least some of the light generated by the source 12. In the context of the invention, it is advantageously configured to scatter at least some at this light.

The assembly 14 is arranged facing the source 12. It is interposed on the optical path of the light emitted by the source 12. More specifically, it is interposed between the source 12 and the outer lens 6.

Figure 2:
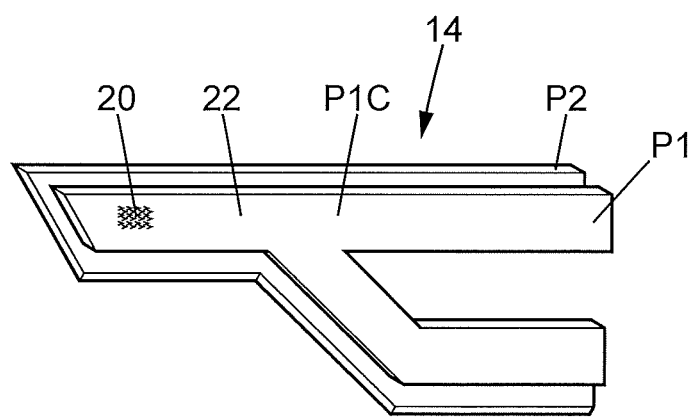
FIG. 2 is an illustration of a front view of a scattering assembly according to the invention.
Figure 3:
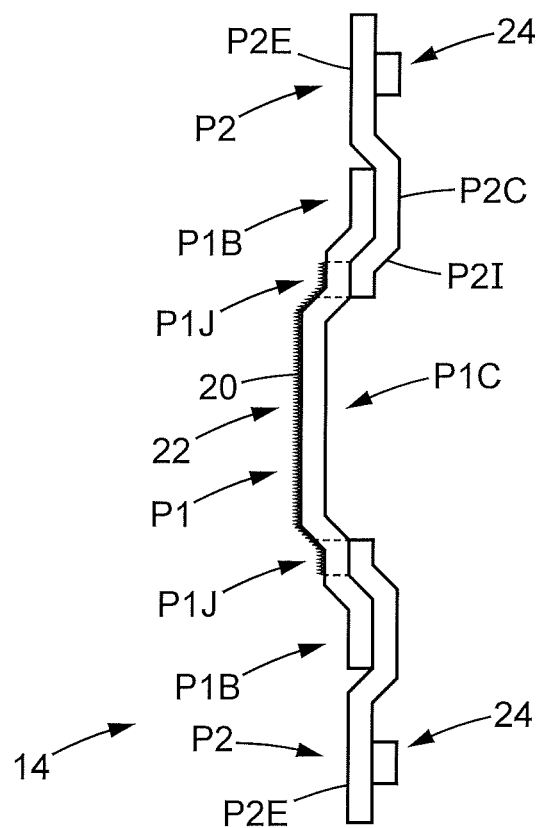
FIG. 3 is aa illustration of a cross section through the scattering assembly of FIG. 2.

With reference to FIGS. 2 and 3, the assembly 14 comprises a first section P1 and a second section P2.

The two sections P1, P2 conjointly define a part of the scattering assembly. Advantageously, this part is the assembly 14.

The two sections P1, P2 are united with each other.

Advantageously they are integral with each other. Here, what is meant by "integral" is that the sections form a one-piece part, as opposed to a configuration in which two parts are joined to each other a posteriori. As described below in more detail, they are formed in contact with each other so as to be united with each other. Here, by "formed in contact with each other", what is meant is that at least the material from which one of them is obtained (for example after setting) is placed in contact with the other section if the latter has already been formed or indeed is placed in contact with the material from which the other section is obtained (for example after setting).

They have thicknesses that are for example of the same order of magnitude.

The first section P1 forms a central section of the assembly 14. The second section P2 defines an external border of the assembly around at least some of the perimeter of the assembly 14.

The first section P1 has any shape. For example, seen from in front, it has a general polygonal shape such as rectangular. Optionally, as illustrated in FIG. 2, it furthermore has an arm extending from a rectangular strip-shaped central section that it comprises, the arm for example being doglegged.

It will be noted that the section P1 is optionally curved. More specifically, in the corresponding configuration, such as seen from above in the direction of the orientation of FIG. 2, the first section P1 is curved.

As illustrated in FIG. 3, which shows a cross section through the assembly, the first section P1 for example has a central portion P1C, and a peripheral portion P1B (FIG. 3).

The central portion has any shape, for example a general polygonal shape such as rectangular. It is for example raised with respect to the peripheral portion.

The central portion P1C and the peripheral portion PIB are for example joined to each other by a junction portion P1J. This junction for example has a general stair-shaped configuration.

The peripheral portion P1B forms a bearing region for the first section P1 on the second section P2. It for example takes the form of a collar, or strip of material, extending away from the central portion P1C. It for example extends substantially parallell to the central portion P1C.

The peripheral portion P1B extends around at least some of the perimeter or the central portion P1C. In the example or FIGS. 2 and 3, it extends around only some of this perimeter, that portion of the assembly which is located furthest to the right in FIG. 2 and forms a lateral end of the assembly not having a peripheral portion. It will be noted that this portion located to the right is for example oriented toward the interior of the vehicle.

The first section P1, and in particular at least the central portion, is configured to scatter the light passing therethrough. In other words, it forms a light-scattering screen.

To this end, it comprises microstructures 20 (only some of which microstructures are illustrated in FIG. 2). As described below, these microstructures 20 are obtained by injection molding. These microstructures are fragile, and in particular tend to degrade when they are touched, for example by a hand or by a gripping object.

These microstructures 20 are advantageously configured to scatter the light reaching them via diffraction, here by diffraction in transmission. To this end, they have characteristic dimensions of an order of magnitude comprised between the order of magnitude of the wavelength of the light emitted by the source 12 and one hundred times this order of magnitude.

These microstructures for example take the form of recesses and/or protrusions produced in a surface of the first section P1.

The microstructures are for example formed in a regular arrangement, such as an arrangement in rows and/or columns (such as for example a matrix-array arrangement). Alternatively, they are formed in an irregular arrangement.

The microstructures are formed within a region 22 of the first section. For example, this region is substantially entirely covered by the microstructures.

This region 22 is advantageously borne by an external face of the first section P1. Here, this external face is turned toward the closing outer lens 6 of the device.

This region 22 for example covers substantially the entirety of the central portion P1C of the first section. Furthermore, for example, it extends over some of the junction portion P1J.

The second section P2 is configured to make it easier to grip and install the first section P1 while allowing its degradation, and in particular the degradation of the microstructures 20, to be avoided.

The second section P2 extends into contact with the first section P1. They make contact with each other via the surface of the first section P1 opposite that bearing the microstructures, i.e. here the infernal face of the first section P1 turned toward the source 12.

The second section P2 for example has a general frame-like configuration running the length of at least some of the perimeter of the first section P1. In the example of FIGS. 2 and 3, the second section runs the length of the same section of the perimeter of the first section as the peripheral portion P1B of the first section.

Still with reference to FIG. 3, the second section P2 comprises an external region P2E, a central region P2C, and an internal region P2I. The external region and the central region are integral with each other. Furthermore, the central region and the internal region are integral with each other.

The external region P2E extends beyond the first section P1 away therefrom around at least some of the perimeter of the first section P1.

In other words, as illustrated in FIG. 3, the external region P2E just out from the peripheral portion P1B of the first section P1, and extends beyond and away from the central portion P1C, around the corresponding portion of the perimeter of the first section P1.

This external region P2E forms a portion for gripping and handling the assembly 14 without the first portion needing to be handled directly.

The external region P2E for example takes the form of a collar. In other words, it takes the form of a strip of material bordering the rest of the assembly 14 a round at least some of the perimeter thereof. It for example extends substantially parallell to the central portion P1C of the first section.

It will be noted that the external region P2E extends over the entirety of the distance covered by the peripheral portion P1B of the first section P1, or indeed only over some thereof. For example, in one specific embodiment, the external region comprises or takes the form of tongues that protrude away from the peripheral portion and that are distant from one another, and thus has a configuration in which empty spaces alternate with bridges extending from the central region P2C. In other words, its strip configuration is discontinuous along the distance covered thereby.

The central region P2C forms a bearing region for the peripheral portion P1B of the first section, with which it makes contact.

Conjointly with the internal and external regions, it for example takes the form of a dish arranged between the latter.

It is for example substantially parallel to the central portion P1C of the first section P1.

The internal region P2I also forms a bearing region for the first section P1. It will be noted that this bearing configuration is optional, the internal region then not necessarily making contact with the back face of the first section. In such a configuration, it optionally extends toward the central portion P1C of the first section, for example in its extension (in which case the central region does not define a dish).

Advantageously, the internal region P2I is at least partially arranged facing a peripheral section of the scattering region 22 including the microstructures 20 and defining the border of the scattering region. Advantageously, this is the case over the entirety of the distance covered by the second section P2.

In other words, as illustrated in FIG. 3, at least some of the internal region P2I forms a mask masking the edges of the scattering region 22 with respect so the light source 12. This mask covers a peripheral section of the scattering region around at least some of the perimeter of this scattering region, and advantageously over the entirety of the distance, defined around the first section P1, covered by the second section P2.

The zones of the scattering region thus masked from the light of the source 12 by the internal region P2I are bounded by dashed lines in FIG. 3.

Advantageously, the second section P2 furthermore comprises fastening means 24 for fastening the assembly 14 to a receiving structure. This receiving structure is for example the casing 4, or indeed a frame that is fixed with respect to this casing.

The fastening means axis 24 are for example provided to allow the assembly 14 to be fastened by adhesive bonding, screw fastening, clip fastening and/or riveting.

The fastening means 24 for example comprise an orifice for receiving a screw or a rivet for screw fastening or riveting, respectively.

Alternatively or in parallel, they comprise a tongue or a zone for receiving a tongue for clip fastening.

Alternatively or in parallel, they comprise a zone configured to adhere via adhesive bonding to the receiving structure.

The fastening means 24 are for example borne by the external region P2E. Alternatively, they are borne by the central region P2C or the internal region P2I. It will be noted that in configurations in which the means 24 comprise elements for fastening the assembly 14 using various fastening techniques, the corresponding elements may be distributed between the various regions of the second section P2.

A plurality of embodiments are envisionable as regards the one or more materials from which the two sections P1, P2 are produced.

Generally, the first section P1 is at least partially transparent to the light emitted by the source 12. In particular, the scattering region 22 is thus transparent.

In a first embodiment, the second section P2 is opaque to the light emitted by the source 12.

The second section P2 is for example red or black in color.

In this embodiment, the first section P1 and the second section P2 are produced from different materials.

The first section P1 for example comprises polymethyl methacrylate (acronym PMMA) or even polycarbonate (acronym PC).

The second section P2 for example comprises polymethyl methacrylate, polycarbonate or acrylonitrile butadiene styrene (acronym ABS).

For example, the second section is produced from opaque black or red PMMA, whereas the first section is produced from transparent red or colorless PMMA.

It will be noted that the opaqueness and color of the sections P1 and P2 are controlled by controlling the nature and amount of additives added to the other elements of the sections, in particular a polymer, from which the section is produced.

For example, the difference between a transparent red PMMA and a colorless PMMA results from the addition to the subsequently polymerized methyl methacrylate of a red dye to obtain red PMMA, and from the absence of dye for the colorless PMMA.

Furthermore, the resulting opaqueness stems from the presence or absence of opaqueness-controlling additives within the considered section. The opaqueness-controlling additives are for example known disperse additives.

In the context of the invention, the first and second sections may be regarded as being formed from a polymer-comprising material containing optional additives.

Advantageously, the materials of the sections P1 and P2 are thus said to be different if the polymer and/or the additives that they comprise are different, and more advantageously if at least one element among the respective opaquenesses, colors and polymers of the sections is different from one section to the other. Here, this means that an observer may see this difference in opaqueness and/or color with the naked eye.

Again by way of example, their respective materials are in contrast said to be identical if the polymer and additives are the same, and more advantageously if the respective opaquenesses, colors and polymers of the sections are identical. Here, this means that an observer sees the opaqueness and the color to be identical with the naked eye.

It will be noted that in this configuration in which the two sections are produced from different materials, the two sections are integral, and an interface between the respective materials of these two parts exists within the assembly 14.

In a second embodiment, the first section P1 and the second section P2 are produced from identical materials, i.e. from the same material, advantageously as defined above.

In this configuration, the two sections are transparent, i.e. at least partially transparent to the light emitted by the source 12.

They are for example produced from PC or PMMA.

For example, they are both produced from colorless or red transparent PMMA.

It will be noted that in this configuration, the sections P1, P2 are integral with each other, and there is advantageously no interface between the two within the material of the assembly.

The operation of the device 2 will now be described with reference to the figures.

During the operation of the device 2, the source 12 generates light. At least some of this light is emitted in the direction of the assembly 14. At least some of this light passes through the first section P1 and is thus scattered by the microstructures 20. The scattered light propagates in the direction of the outer lens 4.

A process for obtaining an assembly 14 according to the invention will now be described with reference to the figures.

Generally, to obtain the assembly 14, the two sections are formed by injection molding.

More specifically, in a step S1, the first section is formed in order to generate therein the microstructures 20 and thus to define the scattering screen that it has, and, in a step S2, the second section is formed.

The sections are formed in contact with each other and are united once formed with each other.

It will be noted that the order of formation of the two sections is unimportant.

Figure 4:
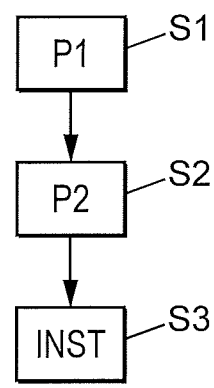
FIG. 4 is a schematic illustration of a manufacturing process according to the invention.

In a first embodiment illustrated in FIG. 4, the second section is formed first, then the first section is formed in contact therewith.

In a second embodiment, this order is reversed: the first section is formed first, then the second section formed next in contact with the first.

In a third embodiment, they are formed simultaneously, or at least in the same injection-molding step.

The details of the formation of the sections depends on the materials chosen therefor.

In a first approach, in the context of which the materials of the two sections P1, P2 are different, the two sections are advantageously formed in an operation of bi-injection molding the two materials from which the sections are formed.

The principle of bi-injection molding is known per se, and is based on the injection of two materials into a given mold. Here, the mold comprises a surface provided to define the microstructures 20, and thus has a zone of geometric configuration complementary to the geometric configuration which the scattering zone 22 is intended to have.

In this approach, the bi-injection of the two materials is sequential.

The material of the section that is formed first is injected in liquid form into the mold so as to occupy a volume corresponding to the definitive shape chosen for the corresponding section.

This material sets at least partially so as to set this shape. Once this material has set at least partially, the material of the second section is injected into the mold in liquid form. It then makes contact with the first injected material while occupying the volume corresponding to the definitive shape chosen for the corresponding section.

On setting in turn, it sets the shape of the corresponding section and unites the material of its section with that of the section formed first.

In a second approach in the context of which the materials of the two sections P1, P2 are identical, the two sections are for example formed in a single injection-molding step.

In the context of the latter, the material from which the two sections are formed is injected into the mold in liquid form, and fills the latter so as to have the final geometric configuration in which it defines both the sections at once.

The material sets and sets the geometric configuration of the assembly, and then preserves said configuration once removed from the mold.

Alternatively, the two sections, which are produced from the same material, are formed sequentially as in the context of the first approach, with the exception that the successively injected materials are identical.

It will be noted that as regards the ejection of the sections P1, P2 from the mold and their subsequent handling, the assembly 14 is handled only by way of the second section P2, the first section P1 and in particular the microstructures 20 not being touched.

At the end on the steps S1 and S2, the obtained assembly 14 is arranged within the device 2.

For example, it is fastened to the casing 4 via the fastening means 24. For example, it is fastened thereto directly or indeed indirectly by way of a frame or any other structure attached to the casing 4.

In this step, when the assembly 14 is handled it is gripped only by way of the second section P2.

The invention has many advantages.

Specifically, because of the presence of the second section within the assembly from the moment of manufacture of the assembly, required handling of the assembly may be carried out so as to limit the risk of degradation of the microstructures obtained by injection molding, which are particularly fragile.

Furthermore, this is obtained simply and inexpensively, and does not require provision to be made for a specific piece of equipment dedicated to the handling of the assembly and specifically designed to prevent degradation of the microstructures.

Furthermore, the second section, which could be qualified a "technical," section in contrast to the first section forming the scattering screen, is present from the moment of manufacture of the assembly, and does not result from an operation for fastening a specific part obtained elsewhere to the scattering screen, such an operation itself representing a risk to the microstructures and being of such a nature as to decrease the mechanical strength of the assembly over time.

The invention claimed is:

1. A process for obtaining a light-scattering assembly for a motor vehicle, the light-scattering assembly comprising first and second sections, the process comprising:
   forming, by injection molding, the first section of the light-scattering assembly, the first section comprising a transparent scattering screen having microstructures obtained by injection molding and configured to scatter light emitted by a light-emitting source and passing through the first section; and
   forming, by injection molding, the second section, the second section being devoid of microstructures obtained by injection molding, the second section comprising an external region extending around at least some of the perimeter of the first section, the external region extending beyond a peripheral portion of the first section and away from the first section,
   the first and second sections being formed in contact with each other and being integral with each other, the first and second sections facing the light-emitting source and being interposed on the optical path of at least some of the light emitted from the light-emitting source towards an output lens and arranged between the light-emitting source and the output lens, wherein
   the microstructures are arranged in the first section on a first face of the first section and the first section makes contact with the second section only via a second face of the first section opposite the first face, the first face of the first section facing the output lens, the output lens being on the opposite side of the light-emitting source relative to the first section, wherein
   the light-emitting source is disposed along a direction perpendicular to the transparent scattering screen having microstructures and the transparent scattering screen receives light directly from the light-emitting source.

2. The process according to claim 1, wherein the microstructures of the first section are arranged within a scattering region of the first section, the second section having an internal region that is arranged facing a peripheral portion of the scattering region around at least some of the perimeter of the scattering region.

3. The process according to claim 1, wherein the second section is opaque.

4. The process according to claim 1, wherein the second section is transparent.

5. The process according to claim 1, wherein the first and second sections are formed by bi-injection molding.

6. The process according to claim 1, wherein the first and second sections are produced from different materials.

7. The process according to claim 1, wherein the first and second sections are produced from the same material.

8. The process according to claim 1, wherein the second section includes a fastener suitable for fastening the light-scattering assembly to a receiving structure.

9. The process according to claim 1, further comprising gripping the light-scattering assembly, the grip being achieved solely by handling the light-scattering assembly via the second section.

10. The process according to claim 2 wherein the second section is opaque.

11. The process according to claim 2, wherein the second section is transparent.

12. The process according to claim 2, wherein the first and second sections are formed by bi-injection molding.

13. A light-scattering assembly for a motor vehicle, the light-scattering assembly comprising:
   a first section forming a transparent scattering screen having microstructures obtained by injection molding and configured to scatter light emitted by a light-emitting source and passing through the first section; and
   a second section, the second section being devoid of microstructures obtained by injection molding, the second section comprising an external region extending around at least some of the perimeter of the first section, the external region extending beyond a peripheral portion of the first section and away from the first section,
   the first and second sections making contact with each other and being integral with each other, the first and second sections facing the light-emitting source and being interposed on the optical path of at least some of the light emitted from the light-emitting source towards an output lens and arranged between the light-emitting source and the output lens, wherein the microstructures are arranged in the first section on a first face of the first section and the first section makes contact with the second section only via a second face of the first section opposite the first face, the first face of the first section facing the output lens, the output lens being on the opposite side of the light-emitting source relative to the first section, wherein the light-emitting source is disposed along a direction perpendicular to the transparent scattering screen having microstructures and the transparent scattering screen receives light directly from the light-emitting source.

14. The light-scattering assembly according to claim 13, wherein the microstructures of the first section are arranged in the first section within a scattering region, the second section having an internal region that is arranged facing a peripheral portion of the scattering region around at least some of the perimeter of the scattering region.

15. The light-scattering assembly according to claim 13, wherein the first and second sections are produced from different materials.

16. The light-scattering assembly according to claim 13, wherein the second section is opaque.

17. A light-emitting device for a motor vehicle, the light-emitting device comprising:

a light-emitting source for emitting light; and a light-scattering assembly, the light-scattering assembly comprising:

a first section forming a transparent scattering screen having microstructures obtained by injection molding and configured to scatter light emitted by the light-emitting source and passing through the first section; and a second section, the second section being devoid of microstructures obtained by injection molding, the second section comprising an external region extending around at least some of the perimeter of the first section, the external region extending beyond a peripheral portion of the first section and away from the first section, the first and second sections making contact with each other and being integral with each other, the first and second sections facing the light-emitting source and being interposed on the optical path of at least some of the light emitted from the active light-emitting source towards an output lens and arranged between the light-emitting source and the output lens, wherein the microstructures are arranged in the first section on a first face of the first section and the first section makes contact with the second section only via a second face of the first section opposite the first face, the first face of the first section facing the output lens, the output lens being on the opposite side of the light-emitting source relative to the first section, wherein the light-emitting source is disposed along a direction perpendicular to the transparent scattering screen having microstructures and the transparent scattering screen receives light directly from the light-emitting source.

18. The light-emitting device according to claim 17, the light-emitting device being a lighting and/or signaling device for a motor vehicle.

* * * * *